(12) United States Patent
Francesco

(10) Patent No.: US 12,506,784 B2
(45) Date of Patent: Dec. 23, 2025

(54) SYSTEMS AND METHODS FOR CYBERSECURITY INFORMATION AND EVENT MANAGEMENT

(71) Applicant: Steven T Francesco, Manhattan, NY (US)

(72) Inventor: Steven T Francesco, Manhattan, NY (US)

(73) Assignee: Tigercat Cyber Corp., Salem, NH (US)

( * ) Notice: Subject to any disclaimer, the term of this patent is extended or adjusted under 35 U.S.C. 154(b) by 295 days.

(21) Appl. No.: 18/461,047

(22) Filed: Sep. 5, 2023

(65) Prior Publication Data

US 2024/0080344 A1 Mar. 7, 2024

Related U.S. Application Data

(60) Provisional application No. 63/403,366, filed on Sep. 2, 2022.

(51) Int. Cl.
*H04L 9/40* (2022.01)

(52) U.S. Cl.
CPC .......... *H04L 63/20* (2013.01); *H04L 63/1416* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| 8,839,435 | B1 * | 9/2014 | King ............... H04L 63/1425 |
| | | | 726/22 |
| 10,091,169 | B2 | 10/2018 | Cohen et al. |
| 10,484,334 | B1 | 11/2019 | Lee et al. |
| 10,686,791 | B1 | 6/2020 | Balmakhtar et al. |
| 10,795,709 | B2 | 10/2020 | Glessner et al. |
| 10,848,522 | B2 | 11/2020 | Prasad et al. |
| 11,258,825 | B1 * | 2/2022 | Yang ................. H04L 63/20 |

(Continued)

FOREIGN PATENT DOCUMENTS

| CN | 102932453 A | 2/2013 |
| CN | 102685180 B | 7/2015 |

(Continued)

*Primary Examiner* — Joseph P Hirl
*Assistant Examiner* — Hassan Saadoun
(74) *Attorney, Agent, or Firm* — Armstrong Teasdale LLP

(57) ABSTRACT

A cybersecurity information and event management system is provided. The system includes a security operations server in communication with a plurality of computer devices in a computer network. The at least one processor is programmed to: a) receive a plurality of logs from the plurality of computer devices in the computer network; b) analyze the plurality of logs to identify a plurality of events that occurred on the computer network; c) categorize the plurality of identified events; d) for each event in a first event category, determine one or more computer devices of the plurality of computer devices associated with the corresponding event; e) determine a plurality of attributes for each computer device associated with at least one event of the first event category; and f) generate a list of computer devices associated with the first event category including the corresponding plurality of attributes.

20 Claims, 6 Drawing Sheets

(56) References Cited

U.S. PATENT DOCUMENTS

| | | | |
|---|---|---|---|
| 11,637,841 B2* | 4/2023 | Seymour | G06F 11/3072 |
| | | | 726/23 |
| 12,132,749 B2* | 10/2024 | Mannengal | G06F 21/52 |
| 2012/0005724 A1 | 1/2012 | Lee | |
| 2012/0011077 A1 | 1/2012 | Bhagat | |
| 2014/0013434 A1* | 1/2014 | Ranum | G06F 21/564 |
| | | | 726/24 |
| 2016/0352589 A1* | 12/2016 | Zhu | H04L 43/04 |
| 2017/0187580 A1* | 6/2017 | Curcic | H04L 63/1416 |
| 2019/0280918 A1* | 9/2019 | Hermoni | G06F 18/214 |
| 2020/0382560 A1 | 12/2020 | Woolward et al. | |
| 2021/0258321 A1* | 8/2021 | Vegulla | G06N 5/04 |
| 2023/0188547 A1* | 6/2023 | Moore | H04L 63/1425 |
| | | | 726/23 |

FOREIGN PATENT DOCUMENTS

| | | |
|---|---|---|
| CN | 105915535 B | 10/2017 |
| CN | 108848110 A | 11/2018 |
| CN | 108959972 A | 12/2018 |
| CN | 106878343 B | 9/2019 |
| CN | 112653697 A | 4/2021 |

\* cited by examiner

SYSTEMS AND METHODS FOR CYBERSECURITY INFORMATION AND EVENT MANAGEMENT

CROSS REFERENCE TO RELATED APPLICATIONS

This application claims the benefit of priority to U.S. Provisional Patent Application No. 63/403,366, filed on Sep. 2, 2022, which is hereby incorporated by reference in its entirety.

BACKGROUND

The field of the disclosure relates generally to cybersecurity information and event management, and more particularly, to systems and methods for controlling and coordinating cyber security analysis systems.

In many cases, users are turning to cloud services to provide remote computing servers to run applications including security services. There are many benefits associated with these cloud services, especially because users no longer need to buy physical servers to run applications and can budget and pay for only the services that they will use, rather than paying for excess capacity. This provides the users with increased flexibility in their server environment and often provides cost-savings. However, as with all systems, there is the potential for cyber security risks. Accordingly, organizations need to analyze their cyber security posture on a regular basis. The National Institute of Standards and Technology (NIST) requires that all companies protect their network, without describing exactly how. Furthermore, many times the threats and solutions are provided by numerous threat intelligence feeds, which are streams of data about potential attacks (known as "threat intelligence") from an external source. Organizations can use threat intelligence feeds to keep their security defenses updated and ready to face the latest attacks. However, keeping track of the important threat intelligence feeds and being able to compare them to the current configuration of all of the computer systems on a network can be challenging. With all of the potential risk factors, it would be desirable for security systems that can provide cyber security analysis, risk assessment, compliance, and remediation systems.

BRIEF DESCRIPTION

In one aspect, a cybersecurity information and event management system is provided. The system includes a security operations server including at least one processor in communication with at least one memory device and a plurality of computer devices in a computer network. The at least one processor is programmed to: a) receive a plurality of logs from the plurality of computer devices in the computer network; b) analyze the plurality of logs to identify a plurality of events that occurred on the computer network; c) categorize the plurality of identified events; d) for each event in a first event category, determine one or more computer devices of the plurality of computer devices associated with the corresponding event; e) determine a plurality of attributes for each computer device associated with at least one event of the first event category; and f) generate a list of computer devices associated with the first event category including the corresponding plurality of attributes. The system may direct additional, less, or alternate functionality, including that discussed elsewhere herein.

In another aspect, a computer-implemented method for cybersecurity information and event management is provided. The method is implemented by a computer device including at least one processor in communication with at least one memory device. The method includes: a) receiving a plurality of logs from the plurality of computer devices in a computer network; b) analyzing the plurality of logs to identify a plurality of events that occurred on the computer network; c) categorizing the plurality of identified events; d) for each event in a first event category, determining one or more computer devices of the plurality of computer devices associated with the corresponding event; e) determining a plurality of attributes for each computer device associated with at least one event of the first event category; and f) generating a list of computer devices associated with the first event category including the corresponding plurality of attributes. The method may direct additional, less, or alternate functionality, including that discussed elsewhere herein.

In a further embodiment, a non-transitory computer-readable storage medium having computer-executable instructions embodied thereon is provided. When executed by a processor coupled to at least memory device, the computer-executable instructions cause the processor to: a) receive a plurality of logs from the plurality of computer devices in a computer network; b) analyze the plurality of logs to identify a plurality of events that occurred on the computer network; c) categorize the plurality of identified events; d) for each event in a first event category, determine one or more computer devices of the plurality of computer devices associated with the corresponding event; e) determine a plurality of attributes for each computer device associated with at least one event of the first event category; and f) generate a list of computer devices associated with the first event category including the corresponding plurality of attributes. The medium may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
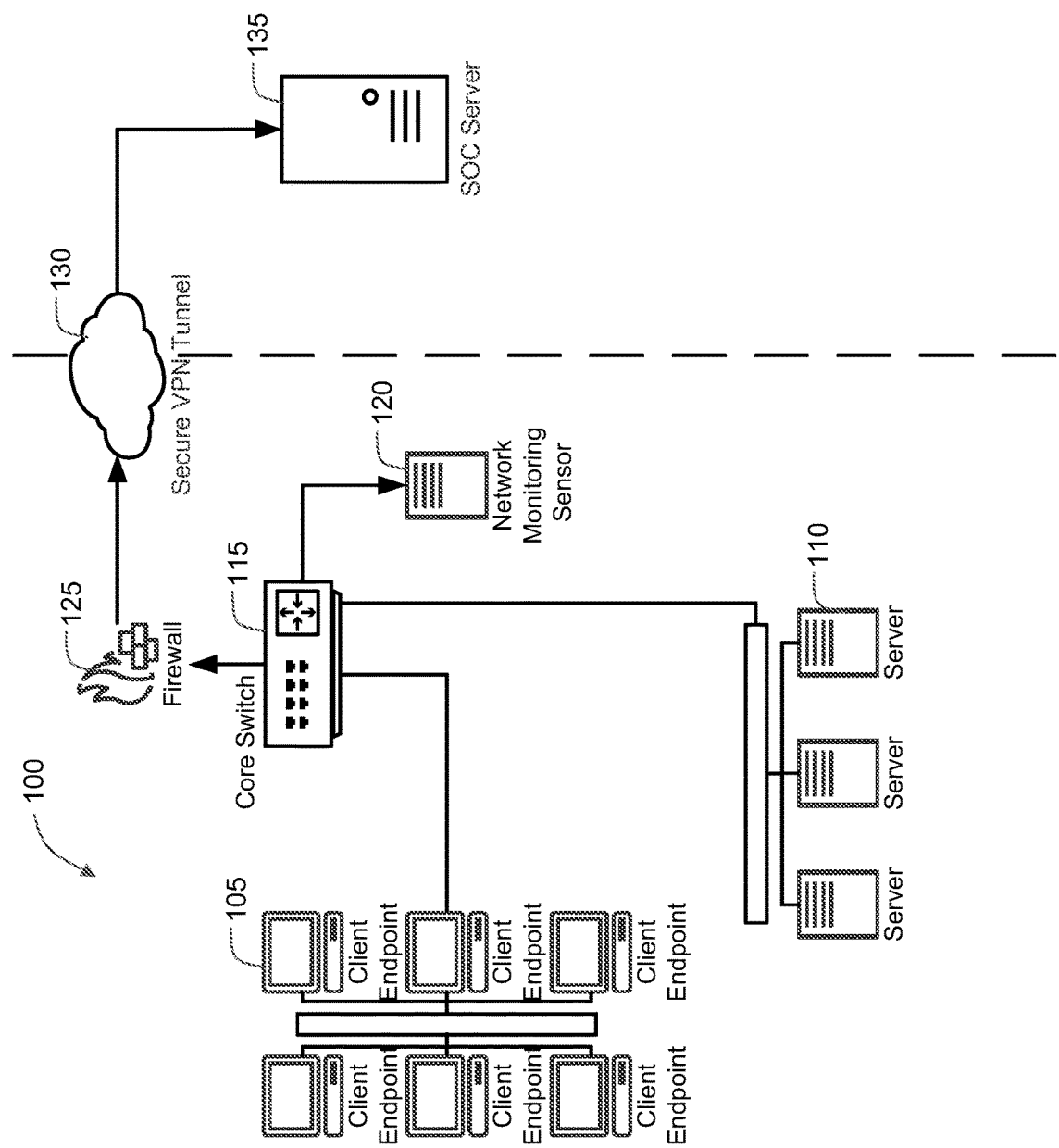
FIG. 1 is a front view of an exemplary cybersecurity information and event management system in accordance with at least one embodiment of the present invention.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present disclosure relates generally to cybersecurity information and event management, and more particularly, to systems and methods for controlling and coordinating cyber security analysis systems.

There are multiple different surfaces upon which cyber security attacks may occur. Monitoring these surfaces to ensure that the security posture is up to date is a full-time activity. Furthermore, every day malicious actors and security researchers are discovering different ways to breach systems. Solutions to these issues follow quickly behind them. However, keeping track of all of the potential breaches, solutions, and current condition of active systems requires information from multiple different systems and may be updated on a regular or irregular basis. Accordingly, the cybersecurity analysis and reporting (CAR) systems described herein provide a solution to these issues.

The CAR system provides managed security and IT infrastructure services. More specifically, one or more cybersecurity analysis and reporting (CAR) computer devices analyze the different programs, services, and/or hardware of computer systems on one or more computer networks in view of currently known security issues. The CAR computer devices then generate and provide effective and easy-to-use reports. The CAR system identifies and manages security events. Then the CAR system provides alerts to allow for a quick and appropriate response.

The CAR system combines multiple essential security capabilities to be managed by a single console, providing services from complete security visibility through threat intelligence across the entire IT infrastructure. These capabilities include, but are not limited to, asset discovery, vulnerability assessment, intrusion detection, behavioral monitoring, event correlation, and/or log management. The CAR system also integrates continuous threat intelligence updates. In the exemplary embodiment, the CAR system consists of a Security Information and Event Management system that supports a cyber security health reporting system.

The CAR system is configured for a predictive, proactive, and preventative security strategy. For the predictive strategy, the CAR system is configured to anticipate potential threats and build protections against them. The CAR system anticipates and predicts known threats by performing diagnostic forensic reviews of the monitored IT infrastructure. For the proactive strategy, the CAR system configures the security posture of the IT infrastructure to withstand external and internal attacks. The CAR system filters out potential security issues with real-time monitoring and centralized threat management. The CAR system performs real-time security audits and reports vulnerabilities immediately. For the preventative strategy, the CAR system employs security controls and vulnerability assessment tools to prevent threats. The CAR system identifies threats, validates IT key controls, identifies control risks, analyzes and reports the root causes of potential threat control weaknesses, and assesses those threat weaknesses with ongoing vulnerability management.

In the exemplary embodiment, the CAR system identifies potential vulnerabilities with deep penetration testing, active device scanning, powerful endpoint protection, and end user behavioral analysis. The CAR system detects policy-violating configurations, malware, viruses, and other potentially harmful threats that may be hidden in the IT infrastructure.

The CAR system is configured to be modular to be modified based on the needs of the computer network/infrastructure being monitored. The core support infrastructure of the CAR system includes, but is not limited to, one or more network monitoring sensors, agents installed on IT endpoints, and/or a security operations center (SOC) server. The network monitoring sensors include virtual or physical hardware deployed within the monitored IT infrastructure to monitor the network elements and host endpoints. The network monitoring sensors are configured to forward suspicious activity to the SOC server. The agents forward system event logs to the SOC server. The SOC server is external to the IT infrastructure being monitored and is in communication with the agents and network monitoring sensors via one or more secure VPN (virtual private network) tunnels. The SOC server is configured to analyze event data to determine alarm conditions. The SOC server also acts as a central coordinator that is responsible for ingestion, classification, and analysis of logs obtained from the IT infrastructure.

The Security Information and Event Management system allows for interaction with a plurality of components. The technology supports threat detection, compliance and security incident management through the collection and analysis (both near real time and historical) of security events, as well as a wide variety of other event and contextual data sources. In particular, the system provides for the capture of all attached device events. The system then correlates the data against an aggregation of a plurality of virus scanners and analyzers, which provides for file type agnostic multi-scanning with a plurality of sandboxes, static analyzes, and antivirus solutions.

In addition, the data flow is further filtered through numerous threat intelligence feeds, which are streams of data about potential attacks (known as "threat intelligence") from an external source. Organizations can use threat intelligence feeds to keep their security defenses updated and ready to face the latest attacks. This allows the system to detect any potentially relevant security issues based on the information provided by the threat intelligence feeds.

The potentially relevant security issues may then be analyzed by automated threat intelligence for end-point detection and response (EDR) integration. In some embodiments, the system provides or integrates with one or more network security managers to deploy and manage fire-walls, connected switches, and access points.

The CAR System Consists of a Security Information and Event Management System that Supports a The cyber security health reporting system extracts data from Security Information and Event Management system. In some embodiments, the extraction is performed via an SQL ODBC gateway. The cyber security health reporting system collects the following information: all statistical data of assets and the processing of all event types for those events; host intrusion detection; network intrusion detection; intrusion databases; asset life cycle exposure; and/or internal vulnerability scans.

In the exemplary embodiment, the cyber security health reporting system collects the information daily and processes the on a pre-set time schedule. For example, each Month may be closed out at 11:59:59 on the last day of the month. The cyber security health reporting system transfers the collected and processed data to the Reporting System.

The collected and processed data can be incorporated into any defined report as described herein. The collected and processed data is grouped by device type (server, network element, workstation) and is also listed by device. The collected and processed data is also tagged, some tags may include, but are not limited to: Graphics—placeholders are mapped within the document; Tables—with dynamic headers and static styles/formats; Field data—pre-defined styles/formatting; and/or Pre-defined internal report data, inclusive of paragraphs or whole pages.

The CAR system uses containers to store documents for processing and which can be overlayed by any predefined report type (e.g., detail report, summary report . . . ). The CAR system allows for new reports to be easily deigned by the user or to be carved out of an existing report. The CAR system also supports adding new information (graphics, tables, or fields) to the environment to be available to add to reports.

The CAR system integrates a plurality of in-house and third-party systems to report on all of the data collected. For example, the CAR system supports a third-party monitoring and reporting attempts by rogue countries trying to access client networks.

The reporting system includes a security score card, which provides a score card of what a hacker would see in scanning a user network. In this embodiment, the scores are rated 'A' through 'F' but can be scored any way the user desires. In the exemplary embodiment, the security score card provides scores for items including, but not limited to, application security, cubit score, DNS health, endpoint security, hacker chatter, IP reputation, leaked information, network security, patching cadence, social engineering, and/or any other rating the user desires. The security score card provides high level list of exposure findings and may be used to provide a competitive gauge against the industry norm.

The reporting system may also integrate vulnerability scan reporting which includes, but is not limited to, high-speed asset discovery, configuration auditing by asset, malware detection, patch, and security vulnerabilities, discovering threats and compliance violations, correlation with exploit frameworks, and/or multiple scan levels.

In the exemplary embodiment, the CAR system includes call detail records (CDR) processing that integrates with the reporting system. The CDR processing includes fraud monitoring. The CDR processing is fully automated to load files, process the CDRs for active fraud monitoring with alerts that may be sent via email and/or SMS (short messaging system). The CDR processing integrates with the reporting system to provide end-of-day, end-of-week, and/or end-of month reporting, such as via email distributed reports.

The CAR system combines the information collected from a variety of different internal and external sources. The CAR system formats the data into tagged items to allow the tagged items to be pulled in to generate a plurality of reports. More specifically, a user may select which tagged items that they wish to view and the CAR system will generate a fresh report with updated versions of the requested information.

FIG. 1 is a front view of an exemplary cybersecurity information and event management system 100 in accordance with at least one embodiment of the present invention. System 100 shows an example configuration of monitoring a computer network 102 for events. System 100 is configured to be modular to be modified based on the needs of the computer network/infrastructure being monitored.

In the exemplary embodiment, computer network 102 includes a plurality of client endpoints 105 and a plurality of servers 110 communicating over the computer network 102, such as though one or more core switches 115. In the exemplary embodiment, the core switch is configured to provide a port mirror to one or more network monitoring sensors 120.

The core support infrastructure of the system 100 includes, but is not limited to, one or more network monitoring sensors 120, agents installed on client endpoints 105, and/or a security operations center (SOC) server 135. The network monitoring sensors 120 include virtual or physical hardware deployed within the monitored computer network 102/IT infrastructure to monitor the network elements and host endpoints. The network monitoring sensors 120 are configured to forward suspicious activity to the SOC server 135. The agents in the client endpoints 105 forward system event logs to the SOC server 135. The SOC server 135 is external to the computer network 102/IT infrastructure being monitored and is in communication with the agents and network monitoring sensors 120 via one or more secure VPN (virtual private network) tunnels 130. The SOC server 135 is configured to analyze event data to determine alarm conditions. The SOC server 135 also acts as a central coordinator that is responsible for ingestion, classification, and analysis of logs obtained from the IT infrastructure.

The network monitoring sensors 120 analyze communications between the client endpoints 105 and servers 110. In some embodiments, the network monitoring sensors 120 view and analyze the messages between the computer network 102 and external systems and networks to detect potential intrusions and other malicious actions.

In the exemplary embodiment, the computer network 102 communicates with external systems and networks via one or more firewalls 125. For monitoring the computer network 102 communicates with one or more security operations center (SOC) servers 135 via secure VPN tunnels 130. The SOC server 135 is configured to collect the data about the events and communications in the computer network 102 and then detect issues and provide potential solutions as described herein.

While system 100 is shown with only one computer network 102, that is for illustrative purposes only. One having skill in the art would understand that the IT infrastructure of an enterprise and/or corporation may be significantly larger and complicated. However, the systems and methods described herein provide for supporting other and larger configurations of computer networks and/or multiple computer networks simultaneously.

Figure 2:
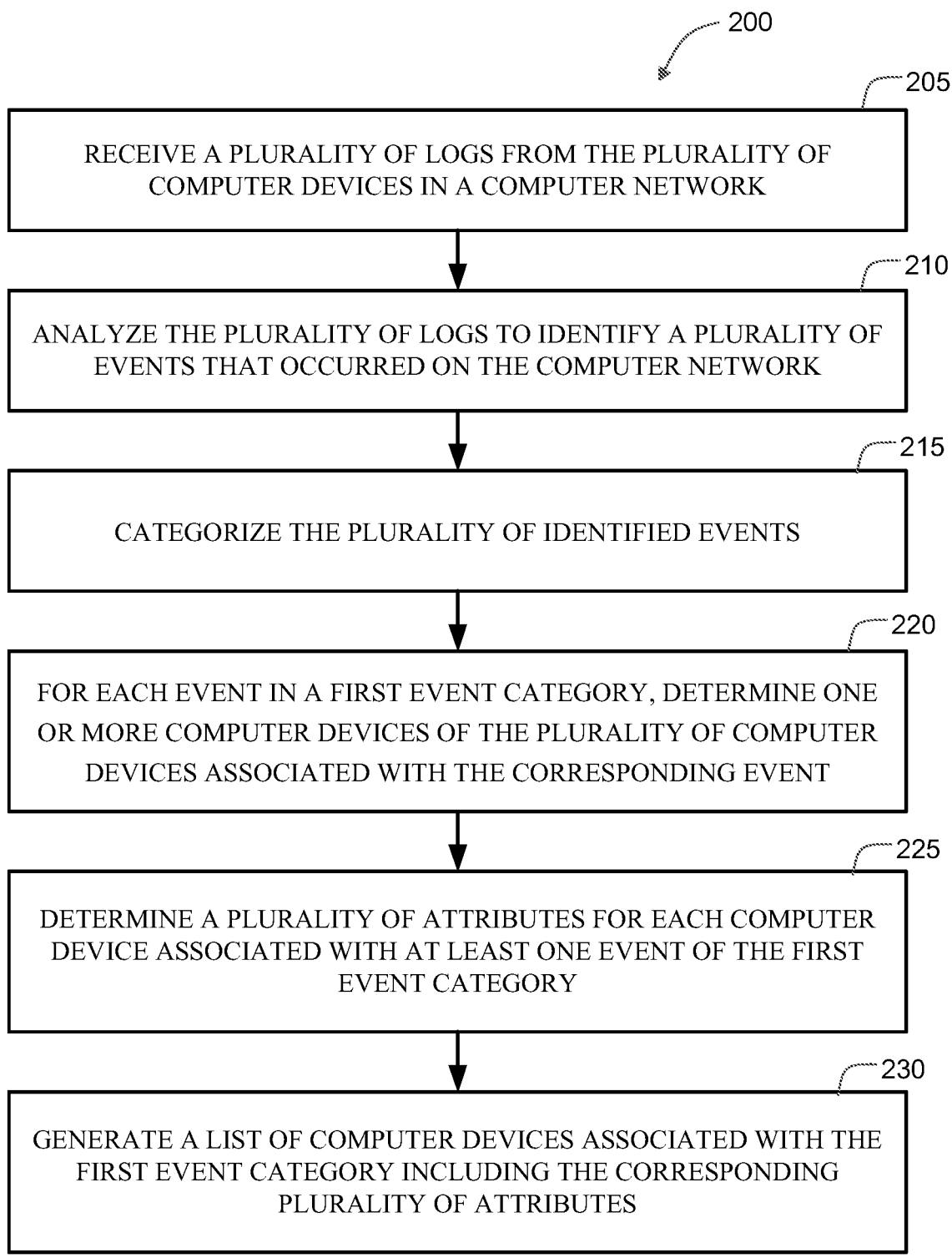
FIG. 2 illustrates a flow chart of an exemplary process for cybersecurity information and event management using the system shown in FIG. 1.

FIG. 2 illustrates a flow chart of an exemplary process 200 for cybersecurity information and event management using the system 100 (shown in FIG. 1). In the exemplary embodiment, process 200 is performed by the SOC server 135 (shown in FIG. 1).

In the exemplary embodiment, the SOC server 135 receives 205 a plurality of logs from the plurality of computer devices, such as client endpoints 105 (shown in FIG. 1), in the computer network 102 (shown in FIG. 1). The logs may include, but are not limited to, CSV files, text files, XML files, JSON files, Windows event logs, Common Event Format (CEF) logs, NCSA Common Log Format (CLF) logs, Extended Log Format (ELF) logs, W3C Extended Log File Format logs, and/or any other format of logs as needed. In the exemplary embodiments, the SOC server 135 receives 205 logs for a period of time, such as, but not limited to, an hour, a day, a week, a month, a year, and/or any other division of time as needed by the system 100 and/or the user.

In the exemplary embodiment, the SOC server 135 analyzes 210 the plurality of logs to identify a plurality of events that occurred on the computer network 102. In the exemplary embodiment, the logs are analyzed 210 on a periodic basis, such as, but not limited to, at least one of every hour, every day, every week, and/or every month. Events may occur with any of the devices in the computer network 102 being analyzed.

In the exemplary embodiment, the SOC server 135 categorizes 215 the plurality of identified events. Categories of events include, but are not limited to, vulnerability detection, windows Sysmon process anomalies, suspicious processes, Sysmon error events, Windows Application error events, windows logon failures, network intrusion detection events, MITER ATT&CKs, brute force attacks, process injection attacks, account manipulation events, and/or any other event to allow the system 100 to work as described herein.

For each event in a first event category, the SOC server 135 determines 220 one or more computer devices of the plurality of computer devices associated with the corresponding event.

In the exemplary embodiment, the SOC server 135 determines 225 a plurality of attributes for each computer device associated with at least one event of the first event category. The plurality of attributes includes information about the computer device, such as, but not limited to, software versions, hardware configuration, driver versions, port configuration, etc. The SOC server 135 may store a plurality of attributes for each computer device on the computer network 102. In at least one embodiment, the SOC server 135 determines the plurality of attributes for each computer device by scanning the corresponding computer device.

In the exemplary embodiment, the SOC server 135 generates 230 a list of computer devices associated with the first event category including the corresponding plurality of attributes.

In some further embodiments, the SOC server 135 determines at least one corrective action for a first computer device associated with an event of the first event category based upon the plurality of attributes of the first computer device. In some of these embodiments, the SOC server 135 applies the corrective action to the first computer device, such as where the corrective action is to deploy a patch to the first computer device. In additional embodiments, the SOC server 135 transmits one or more alerts about the first computer device and the at least one corrective action.

In yet further embodiments, for each event in a second event category, the SOC server 135 determines one or more computer devices of the plurality of computer devices associated with the corresponding event. The SOC server 135 determines a plurality of attributes for each computer device associated with at least one event of the second event category. The SOC server 135 generates a list of computer devices associated with the second event category including the corresponding plurality of attributes.

In additional embodiments, the SOC server 135 generates a report including a plurality of event categories associated with a plurality of computer devices including a number of occurrences of each event on each corresponding computer device. In yet additional embodiments, the plurality of computer devices associated with each event category are prioritized based on severity.

In still additional embodiments, the SOC server 135 stores a plurality of report templates. Each report template includes a plurality of containers, and each container includes a subset of information. The SOC server 135 generates a report by updating the subset of information in each of the containers in the report. In some of these embodiments, the SOC server 135 updates the information in the plurality of containers when the list of computer devices is generated.

In some embodiments, the report provides a summary of the cybersecurity information and event management system 100 monitoring results for thirty (30) calendar days. In other embodiments, the report covers other periods of time. The objective is to present the findings, noted areas of concern, and recommendations.

The cybersecurity information and event management system 100 offers a multi-layer strategy for cybersecurity protection, starting with anti-virus, anti-spam, malware/ransomware protection, firewall/IDS, snap-shot Vulnerability scans, inclusive of cybersecurity information and event management system 100 integrated V-scans—running periodically and extending to real-time monitoring. Many of the technologies overlap, which provides for that extra crossover protection.

The cybersecurity information and event management system 100 is a real-time, continuous view of an IT environment and/or computer network 102. The cybersecurity information and event management system 100 monitors all connected devices while addressing regulatory and cybersecurity requirements.

For the desired period of time, the cybersecurity information and event management system 100 generates a summary report of all activity on the computer network 102. The cybersecurity information and event management system 100 is constantly monitoring, using events forwarded by the network sub-systems, servers, workstations, and other devices for signs of suspicious behavior. This alert data includes all network traffic, events and flows (e.g., the actual logins, file access, internet traffic, etc.). The cybersecurity information and event management system 100 ultimately creates and grades alerts for investigation (CRITICAL, HIGH, and MEDIUM . . . ).

The cybersecurity information and event management system 100 generates reports to summarize the security event activity, providing details on the type of alert, potential intent or purpose, the related number of alarms or events that occurred, the systems affected, and the source IP-address of the attack.

The cybersecurity information and event management system 100 includes an Intrusion Detection System (IDS) that analyzes the computer network 102 for malicious activities or policy violations. An IDS is used to make security personnel aware of packets entering and leaving the monitored network 102. There are two general types of systems: a Host-based IDS (HIDS) and a Network-based IDS (NIDS).

Additionally, the IDS employed to detect movements by searching for particular signatures of well-known threats.

The cybersecurity information and event management system 100 uses the host detection system to analyze the traffic to and from the specific computer 105 on which the intrusion detection agent is installed. The HIDS have the ability to monitor key system files and any attempt to overwrite these files. The system 100 will also detect an intrusion and/or misuse, and responds by logging the activity, as well as notifying the designated authority. The HIDS act as an agent that monitors and analyzes whether anything or anyone, whether internal or external, has circumvented the system's security policy.

The cybersecurity information and event management system 100 uses NIDS that include a 'sensor' appliance that includes network detection capabilities. The NIDS analyzes data packets both inbound and outbound and offer real-time detection.

The cybersecurity information and event management system 100 includes an Intrusion Detection System (IDS) for the specific screening of operating system specific generated events. The information is parsed through HIDS agent and include as benign an event as a user logging in. The system 100 can distinguish a 'brute force attack', with the user's credentials being repeatedly changed to accomplish an illegal access.

The cybersecurity information and event management system 100 also includes Network Intrusion Detection (NIDS) agents to monitor and analyze network traffic to protect a system from network-based threats. The NIDS agents read all inbound packets and searches for any suspicious patterns. When threats are discovered, based on its severity, the system 100 can take action such as notifying administrators, or barring the source IP address from accessing the network 102.

Attackers continuously develop new exploits and attack techniques designed to circumvent protective defenses. Many attacks leverage malware or social engineering to obtain user credentials that grant them access to the network and data. A NIDS is crucial for network security because it enables the detection and response to malicious traffic. The cybersecurity information and event management system 100 uses NIDS to detect malicious activity such as denial-of-service attacks, port scans and attacks by monitoring the network traffic.

The cybersecurity information and event management system 100 includes MITRE ATT&CK, which is a documented collection of information about the malicious behaviors Advanced Persistent Threat (APT) groups have used at various stages in real-world cyberattacks. ATT&CK, which stands for Adversarial Tactics, Techniques, and Common Knowledge, includes detailed descriptions of these groups' observed tactics (the technical objectives they're trying to achieve), techniques (the methods they use), and procedures (specific implementations of techniques), commonly called TTPs.

Although MITRE ATT&CK is not a threat model per se, it is used as the foundation for developing customized threat models. It describes TTPs adversaries use, provides suggestions for detection and common mitigations for specific techniques, and profiles APT groups' known practices, characteristics, and specific attack attributions. ATT&CK also provides an extensive list of software used in attacks (both malware and commercially available and open-source code that can be used legitimately or maliciously).

All information captured in ATT&CK comes from publicly available data and reports as well as from the community—threat researchers and security teams in the trenches experiencing or analyzing attacks daily.

The cybersecurity information and event management system 100 takes daily samples of event information and are compiled to profile an historical measurement of HIDS/NIDS potential exposure. In addition, the cybersecurity information and event management system 100 has various threat feeds and an extensive library of viruses to filter against the event generated alarms. By promoting patches, along with systematic updates, the cybersecurity information and event management system 100 promotes improved security of the monitored computer networks 102.

In presenting risk exposure, there are various weighted metrics and levels of interpretation considered within the Cyber industry. The cybersecurity information and event management system 100 includes and promotes layers of Cyber defenses, e.g., Anti-Virus, Malware/Ransomware Detection, Firewall/IDS, Endpoint Detection and Response (EDR), V-Scans, SIEM, and SOC surveillance—all supported by a highly experienced team of Cybersecurity professionals. Much of the data generated on a standalone product/service offers some value, but not enough to ensure the security of the entire environment. In determining a potential point of attack, the secret behind all of the available solutions is the correlation of data; in other words, connecting the dots.

The Common Vulnerability Scoring System (CVSS) provides a way to capture the principal characteristics of a vulnerability, producing a numerical score reflecting its severity. The statistical score can then be translated into a qualitative representation (such as CRITICAL, HIGH, MEDIUM, and LOW) to assist organizations in properly assessing and prioritizing their cyber management plan. Identified vulnerabilities are classified based on the potential risk by a malicious actor (a hacker).

A CRITICAL vulnerability is a vulnerability whose exploitation can lead to direct and immediate access to sensitive or critical internal resources. The cybersecurity information and event management system 100 promotes patching CRITICAL vulnerabilities as soon as possible. A HIGH vulnerability is an exploit widely known to attackers, which could result in the compromise of the confidentiality, integrity, or availability of organizational resources. The cybersecurity information and event management system 100 promotes addressing HIGH-level alerts in the near term (Within 30 days).

A MEDIUM vulnerability indicates potential exposure and may escalate. It is supported by such factors as authentication requirements or custom system configurations. The cybersecurity information and event management system 100 promotes remediating through normal patching and security maintenance. A LOW vulnerability is recognized as being resolved through normal support and/or existing controls, although it should be actively monitored. The cybersecurity information and event management system 100 promotes evaluating the level of effort to patch.

The cybersecurity information and event management system 100 performs multiple scans of the computers and networks it monitors to: a) discover of any existing attack vectors, which are services that could be used for the potential compromise of OSI's network hosts and system assets; b) determine the vulnerabilities and threats that affect the data processing environment terms of confidentiality, integrity, and availability; c) identify and evaluate of the existing and planned controls; d) assess security infrastructure for attack visibility and derived informational value; e) examine implemented cybersecurity technologies for their effectiveness in event visibility, analysis, and response proceedings; and to f) develop of a protection strategy, inclusive of a mitigation plan linked to critical assets.

Figure 3B:
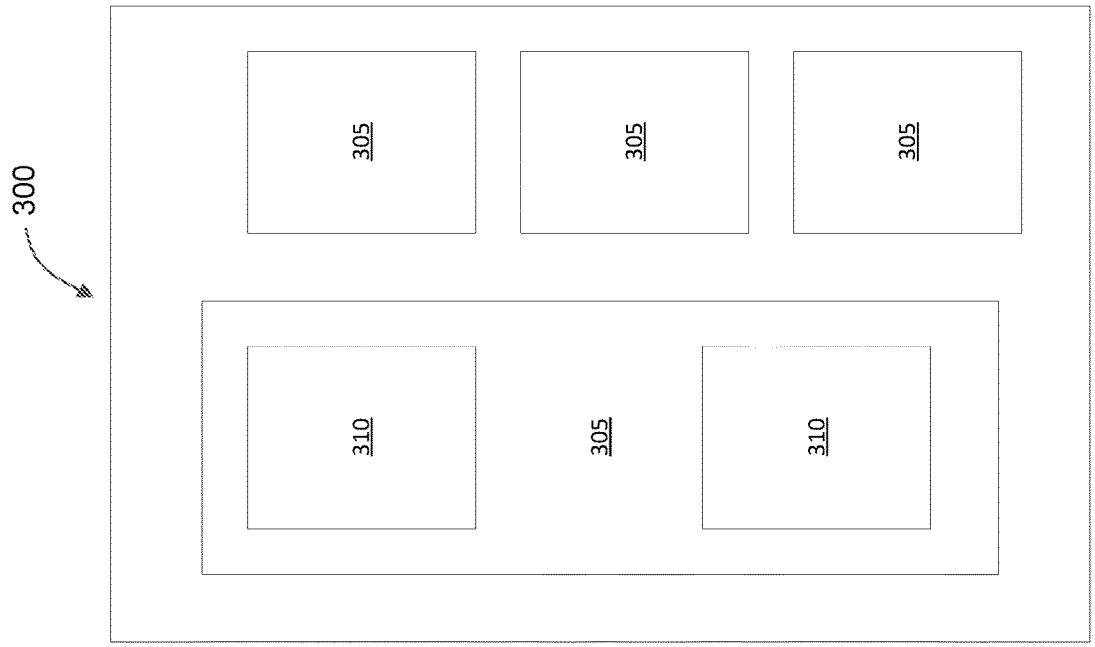
FIGS. 3A and 3B illustrate exemplary examples of report templates for the process shown in FIG. 2 and using the system shown in FIG. 1.
Figure 3A:
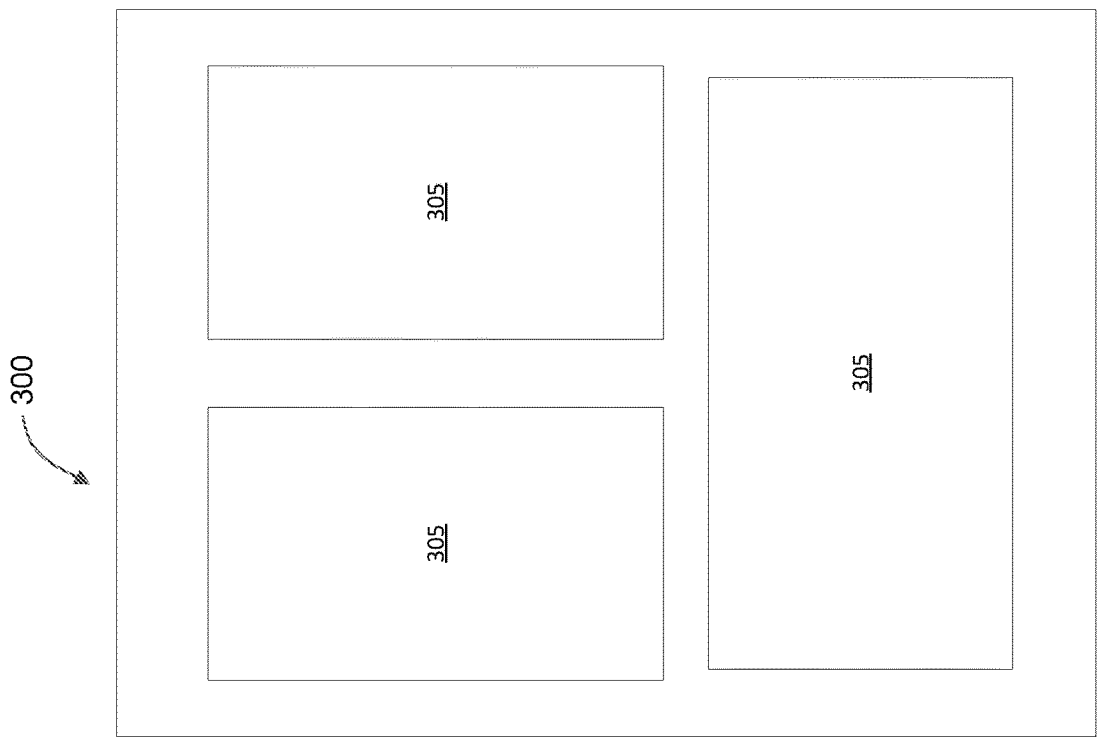

FIGS. 3A and 3B illustrate exemplary examples of report templates 300 for the process 200 (shown in FIG. 2) and using the system 100 (shown in FIG. 1). Each report template 300 includes a one or more containers 305. Each container 305 includes a plurality of information. For example, a container 305 may include data about one or more vulnerabilities, systems, and/or event categories.

In the exemplary embodiment, the SOC server 135 stores a plurality of report templates 300. Each report template 300 includes a plurality of containers 305 and each container 305 includes a subset of information. The SOC server 135 generates a report by updating the subset of information in each of the containers 305 in the report. In some embodiments, the containers 305 may include sub-containers 310 with more specialized information.

Furthermore, a user may format, create, and/or modify a report by changing the containers 305 in that report. In at least one embodiment, the SOC server 135 updates each of the containers when their corresponding information changes. Then when a report is requested, the SOC server 135 retrieves the appropriate containers 305 which include the corresponding up to date information.

Figure 4:
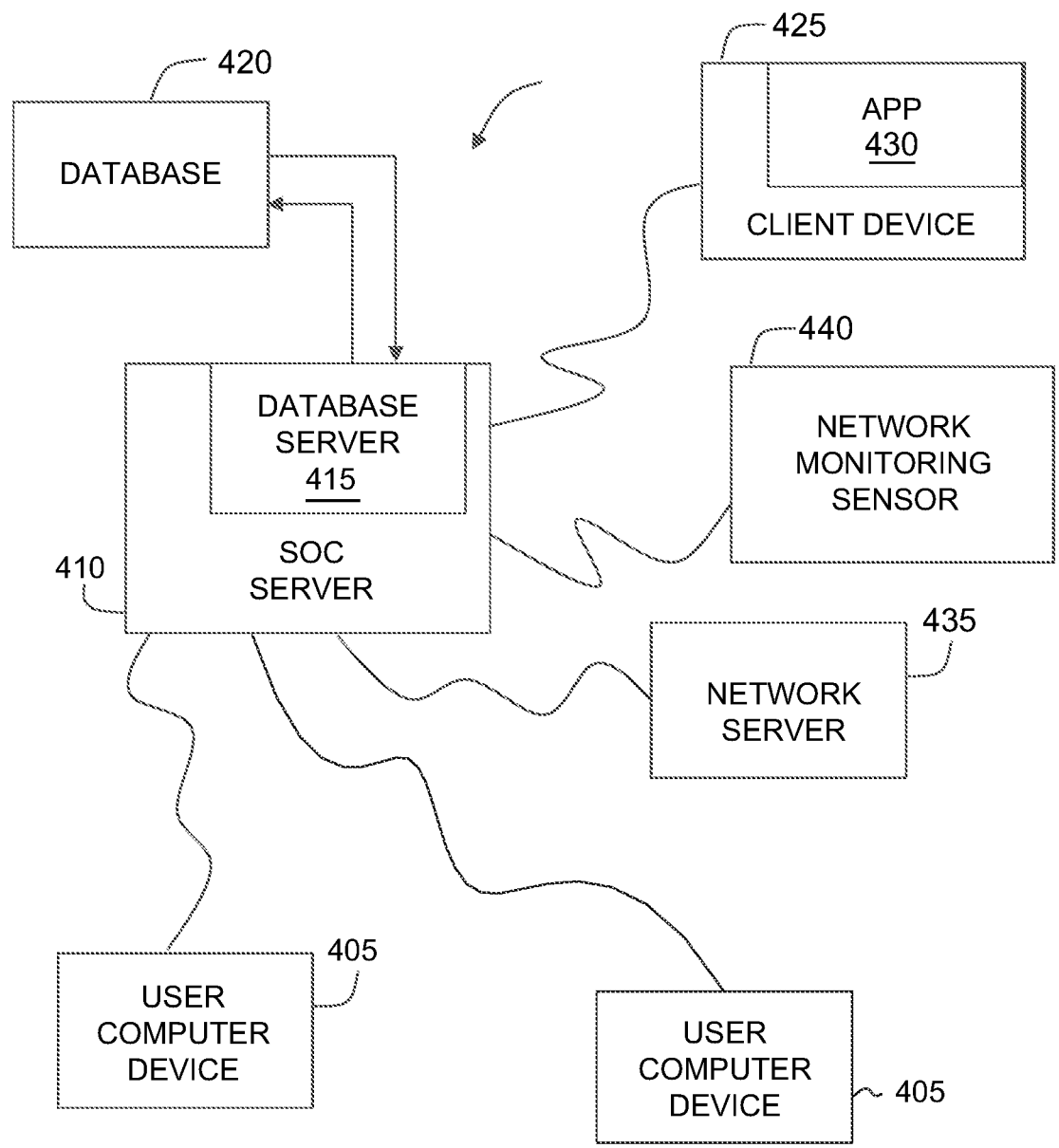
FIG. 4 illustrates a simplified block diagram of an exemplary cybersecurity analysis and reporting system for implementing the process shown in FIG. 2.

FIG. 4 illustrates a simplified block diagram of an exemplary cybersecurity analysis and reporting system 400 for implementing the process 200 (shown in FIG. 2) in accordance with at least one embodiment of the present disclosure. In the exemplary embodiment, system 400 may be used for analyzing and monitoring the cybersecurity posture of one or more computer networks 102 (shown in FIG. 1). As described below in more detail, a security operations center (SOC) server 410 may be configured to (1) receive a plurality of logs from the plurality of computer devices 105 in the computer network 102; (2) analyze the plurality of logs to identify a plurality of events that occurred on the computer network 102; (3) categorize the plurality of identified events; (4) for each event in a first event category, determine one or more computer devices 105 of the plurality of computer devices 105 associated with the corresponding event; (5) determine a plurality of attributes for each computer device 105 associated with at least one event of the first event category; and (6) generate a list of computer devices 105 associated with the first event category including the corresponding plurality of attributes.

In the exemplary embodiment, user computer devices 405 are computers that include a web browser or a software application, which enables user computer devices 405 to access SOC server 410 using the Internet or other network. More specifically, user computer devices 405 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 405 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. The SOC server 410 may be similar to the SOC server 135 (shown in FIG. 1).

A database server 415 may be communicatively coupled to a database 420 that stores data. In one embodiment, database 420 may include device attributes, vulnerability reports, malicious signatures, and/or other information. In the exemplary embodiment, database 420 may be stored remotely from SOC server 410. In some embodiments, database 420 may be decentralized. In the exemplary embodiment, a user may access database 420 via user computer devices 405 by logging onto SOC server 410, as described herein.

SOC server 410 may be communicatively coupled with the user computer devices 405. In some embodiments, SOC server 410 may be associated with, or is part of a computer network 102. In other embodiments, SOC server 410 may be associated with a third party and is merely in communication with the computer network 102.

A plurality of client devices 425 may be communicatively coupled with SOC server 410 through the Internet or a cellular network to be monitored. In the exemplary embodiment, the plurality of client devices 425 are computers that include a software application 430, which monitors the plurality of client devices 425 and forwards logs to the SOC server 410 using the Internet or other network. More specifically, the plurality of client devices 425 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The plurality of client devices 425 may be, but is not limited to, a personal digital assistant (PDA), a cellular phone, a smartphone, a tablet, a phablet, wearable electronics, smart watch, or other web-based connectable equipment or mobile devices that allow them to function as described herein. The plurality of client devices 425 may be similar to the plurality of client endpoints 105 (shown in FIG. 1).

A plurality of network servers 435 may be communicatively coupled with SOC server 410 through the Internet or a cellular network to be monitored. In the exemplary embodiment, the plurality of network servers 435 are computers are monitored by the SOC server 410 using the Internet or other network. More specifically, the plurality of network servers 435 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The plurality of network servers 435 may be, but is not limited to, a personal digital assistant (PDA), a cellular phone, a smartphone, a tablet, a phablet, wearable electronics, smart watch, or other web-based connectable equipment or mobile devices that allow them to function as described herein. The plurality of network servers 435 may be similar to the plurality of servers 110 (shown in FIG. 1).

In the exemplary embodiment, the network monitoring sensor 440 includes computers that include a web browser or a software application, which enables the network monitoring sensors 440 to forward suspicious activity to the SOC server 410. The network monitoring sensors 120 may include virtual or physical hardware deployed within the monitored computer network 102/IT infrastructure to monitor the network elements and host endpoints. More specifically, the network monitoring sensors 440 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The network monitoring sensors 440 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. The network monitoring sensor 440 may be similar to the network monitoring sensor 120 (shown in FIG. 1).

Figure 5:
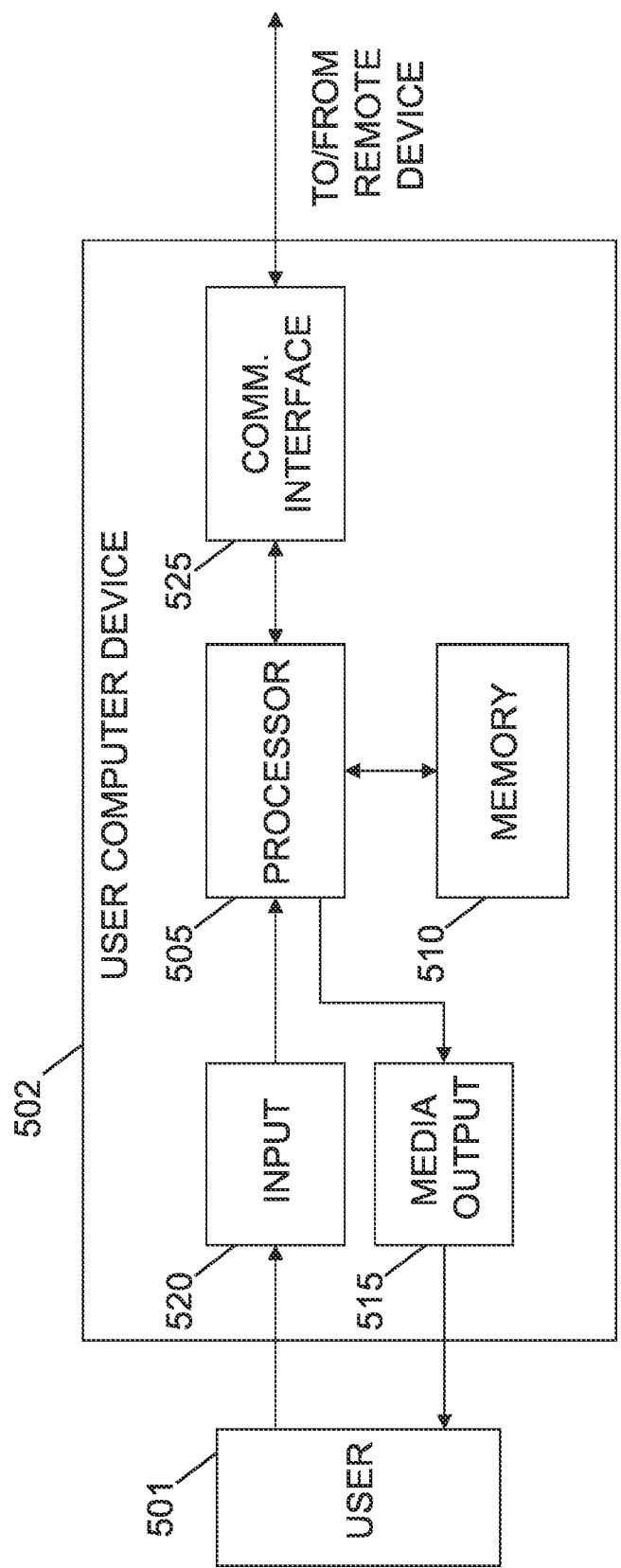
FIG. 5 illustrates an exemplary configuration of a client computer device shown in FIG. 4, in accordance with one embodiment of the present disclosure.

FIG. 5 depicts an exemplary configuration of user computer device 405 (shown in FIG. 4), in accordance with one embodiment of the present disclosure. User computer device 502 may be operated by a user 501. User computer device 502 may include, but is not limited to, client endpoints 105, core switch 115, network monitoring sensor 120 (all shown in FIG. 1), user computer devices 405, client devices 425 and network monitoring sensor (all shown in FIG. 4). User computer device 502 may include a processor 505 for executing instructions. In some embodiments, executable instructions are stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an interface for displaying potential cybersecurity threats. In some embodiments, user computer device 502 may include an input device 520 for receiving input from user 501. User 501 may use input device 520 to, without limitation, adjust one or more containers 305 in a report template 300 (both shown in FIG. 3).

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as SOC server 410 (shown in FIG. 4). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from SOC server 410. A client application allows user 501 to interact with, for example, SOC server 410. For example, instructions may be stored by a cloud service, and the output of the execution of the instructions sent to the media output component 515.

Processor 505 executes computer-executable instructions for implementing aspects of the disclosure. In some embodiments, the processor 505 is transformed into a special purpose microprocessor by executing computer-executable instructions or by otherwise being programmed. For example, the processor 505 may be programmed with the instruction such as illustrated in FIG. 2.

In some embodiments, user computer device 502 may include, or be in communication with, one or more sensors, such as network monitoring sensor 440. User computer device 502 may be configured to receive data from the one or more sensors and store the received data in memory area 510. Furthermore, user computer device 502 may be configured to transmit the sensor data to a remote computer device, such as SOC server 410, through communication interface 525.

Figure 6:
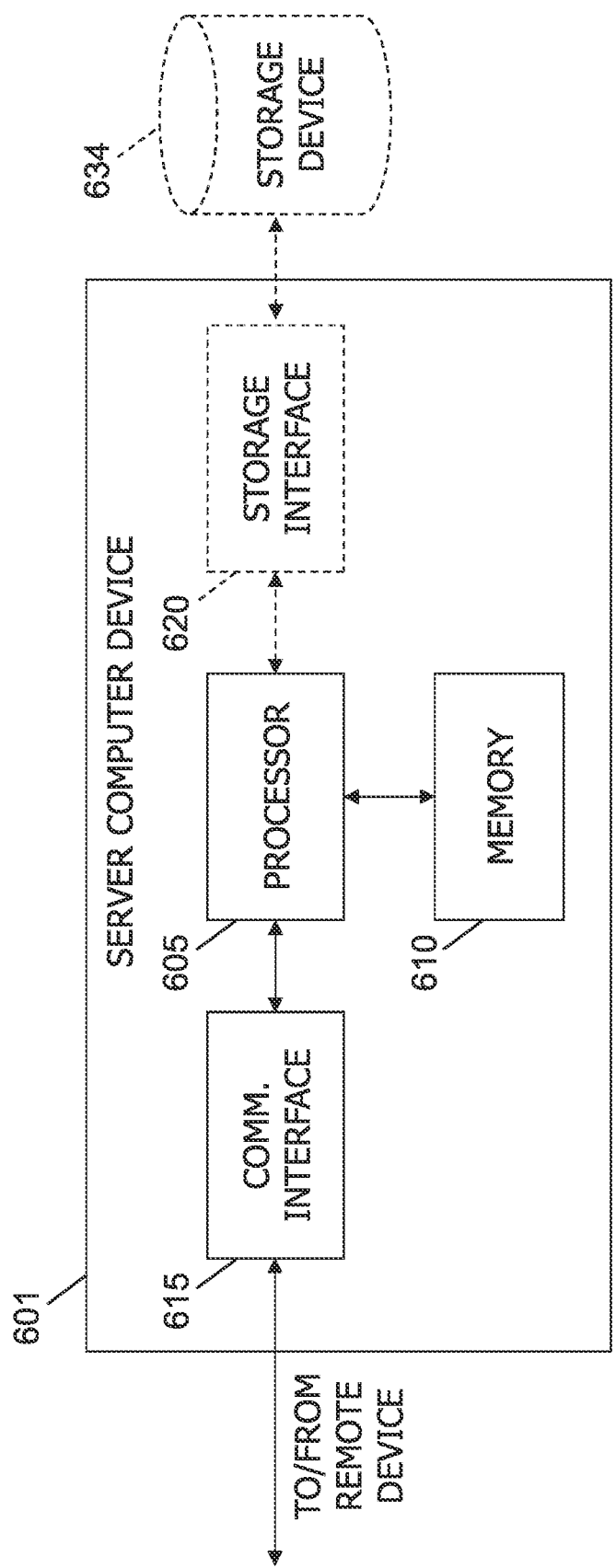
FIG. 6 illustrates an exemplary configuration of a server shown in FIG. 4, in accordance with one embodiment of the present disclosure.

FIG. 6 depicts an exemplary configuration of a server 410 (shown in FIG. 4), in accordance with one embodiment of the present disclosure. Server computer device 601 may include, but is not limited to, server 110, core switch 115, SOC server 135 (all shown in FIG. 1), SOC server 410, database server 415, and network server 435 (all shown in FIG. 4). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, SOC server 410, client endpoint 105 (shown in FIG. 1), user computer device 405 (shown in FIG. 4), and network monitoring sensor 120 (shown in FIG. 1). For example, communication interface 615 may receive requests from user computer devices 405 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 420 (shown in FIG. 4). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid-state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIG. 2.

At least one of the technical problems addressed by this system may include: (i) improved computer network security; (ii) reduced vulnerable surfaces in a computer network; (iii) consolidated cybersecurity analysis; (iv) improved threat assessment; and/or (v) improved speed of vulnerability patching.

The methods and systems described herein may be implemented using computer programming or engineering techniques including computer software, firmware, hardware, or any combination or subset thereof, wherein the technical effects may be achieved by performing at least one of the following steps: a) receive a plurality of logs from the plurality of computer devices in the computer network; b) analyze the plurality of logs to identify a plurality of events that occurred on the computer network; c) categorize the plurality of identified events; d) for each event in a first event category, determine one or more computer devices of the plurality of computer devices associated with the corresponding event; e) determine a plurality of attributes for each computer device associated with at least one event of the first event category; f) generate a list of computer devices associated with the first event category including the corresponding plurality of attributes; g) determine at least one corrective action for a first computer device associated with an event of the first event category based upon the plurality of attributes of the first computer device; h) apply the corrective action to the first computer device; i) wherein the corrective action is to deploy a patch to the first computer device; j) transmit one or more alerts about the first computer device and the at least one corrective action; k) for each event in a second event category, determine one or more computer devices of the plurality of computer devices associated with the corresponding event; l) determine a plurality of attributes for each computer device associated with at least one event of the second event category; m) generate a list of computer devices associated with the second event category including the corresponding plurality of attributes; n) generate a report including a plurality of event categories associated with a plurality of computer devices including a number of occurrences of each event on each corresponding computer device; o) wherein the plurality of computer devices associated with each event category are prioritized based on severity; p) store a plurality of report templates, wherein each report template includes a plurality of containers, wherein each container includes a subset of information; q) generate a report by updating the subset of information in each of the containers in the report; r) update the information in the plurality of containers when the list of computer devices is generated; s) wherein the plurality of logs are analyzed on a periodic basis; and/or t) wherein the periodic basis includes at least one of every hour, every day, every week, and/or every month.

ADDITIONAL CONSIDERATIONS

The present embodiments may facilitate avoiding vehicle collisions, or otherwise mitigating damage and injuries caused by vehicle collisions. Thus, vehicles configured with the functionality and computer systems may have a lower level of risk than conventional vehicles. Therefore, lower insurance premiums and/or insurance discounts may be generated and provided to insured's owning vehicles configured with the functionality and/or computer systems discussed herein.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further example, the system is run on Android® OS (Android is a registered trademark of Google, Inc. of Mountain View, CA). In another example, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional examples that also incorporate the recited features. Further, to the extent that terms "includes," "including," "has," "contains," and variants thereof are used herein, such terms are intended to be inclusive in a manner similar to the term "comprises" as an open transition word without precluding any additional or other elements.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cybersecurity information and event management system comprising a security operations server comprising at least one processor in communication with at least one memory device and a plurality of computer devices in a computer network, wherein the at least one processor is programmed to:
   receive a plurality of logs from the plurality of computer devices in the computer network;
   analyze the plurality of logs to identify a plurality of events that occurred on the computer network;
   categorize the plurality of identified events;
   for each event in a first event category, determine one or more computer devices of the plurality of computer devices associated with the corresponding event;
   determine a plurality of attributes for each computer device associated with at least one event of the first event category; and
   generate a list of computer devices associated with the first event category including the corresponding plurality of attributes.

2. The system of claim 1, wherein the at least one processor is further programmed to determine at least one corrective action for a first computer device associated with an event of the first event category based upon the plurality of attributes of the first computer device.

3. The system of claim 2, wherein the at least one processor is further programmed to apply the corrective action to the first computer device.

4. The system of claim 2, wherein the corrective action is to deploy a patch to the first computer device.

5. The system of claim 2, wherein the at least one processor is further programmed to transmit one or more alerts about the first computer device and the at least one corrective action.

6. The system of claim 1, wherein the at least one processor is further programmed to:
   for each event in a second event category, determine one or more computer devices of the plurality of computer devices associated with the corresponding event;
   determine a plurality of attributes for each computer device associated with at least one event of the second event category; and
   generate a list of computer devices associated with the second event category including the corresponding plurality of attributes.

7. The system of claim 1, wherein the at least one processor is further programmed to generate a report including a plurality of event categories associated with a plurality of computer devices including a number of occurrences of each event on each corresponding computer device.

8. The system of claim 7, wherein the plurality of computer devices associated with each event category are prioritized based on severity.

9. The system of claim 1, wherein the at least one processor is further programmed to:
   store a plurality of report templates, wherein each report template includes a plurality of containers, wherein each container includes a subset of information; and
   generate a report by updating the subset of information in each of the containers in the report.

10. The system of claim 9, wherein the at least one processor is further programmed to update the information in the plurality of containers when the list of computer devices is generated.

11. The system of claim 1, wherein the plurality of logs are analyzed on a periodic basis.

12. The system of claim 11, wherein the periodic basis includes at least one of every hour, every day, every week, and/or every month.

13. A computer-implemented method for cybersecurity information and event management, the method implemented by a computer device including at least one processor in communication with at least one memory device, the method comprises:
   receiving a plurality of logs from the plurality of computer devices in a computer network;
   analyzing the plurality of logs to identify a plurality of events that occurred on the computer network;
   categorizing the plurality of identified events;
   for each event in a first event category, determining one or more computer devices of the plurality of computer devices associated with the corresponding event;
   determining a plurality of attributes for each computer device associated with at least one event of the first event category; and
   generating a list of computer devices associated with the first event category including the corresponding plurality of attributes.

14. The method of claim 13 further comprising determining at least one corrective action for a first computer device associated with an event of the first event category based upon the plurality of attributes of the first computer device.

15. The method of claim 14 further comprising:
   applying the corrective action to the first computer device, wherein the corrective action is to deploy a patch to the first computer device; and
   transmitting one or more alerts about the first computer device and the at least one corrective action.

16. The method of claim 13 further comprising:
   for each event in a second event category, determining one or more computer devices of the plurality of computer devices associated with the corresponding event;
   determining a plurality of attributes for each computer device associated with at least one event of the second event category; and
   generating a list of computer devices associated with the second event category including the corresponding plurality of attributes.

17. The method of claim 13 further comprising generating a report including a plurality of event categories associated with a plurality of computer devices including a number of occurrences of each event on each corresponding computer device, wherein the plurality of computer devices associated with each event category are prioritized based on severity.

18. The method of claim 13 further comprising:
   storing a plurality of report templates, wherein each report template includes a plurality of containers, wherein each container includes a subset of information; and
   generating a report by updating the subset of information in each of the containers in the report.

19. The method of claim 18 further comprising updating the information in the plurality of containers when the list of computer devices is generated.

20. A non-transitory computer-readable storage medium having computer-executable instructions embodied thereon, wherein when executed by a processor coupled to at least memory device, the computer-executable instructions cause the processor to:
   receive a plurality of logs from the plurality of computer devices in a computer network;
   analyze the plurality of logs to identify a plurality of events that occurred on the computer network;
   categorize the plurality of identified events;
   for each event in a first event category, determine one or more computer devices of the plurality of computer devices associated with the corresponding event;
   determine a plurality of attributes for each computer device associated with at least one event of the first event category; and
   generate a list of computer devices associated with the first event category including the corresponding plurality of attributes.

* * * * *